United States Patent [19]

Krietzmen et al.

[11] Patent Number: 5,778,825
[45] Date of Patent: Jul. 14, 1998

[54] FELINE EXERCISE AND PLAY TARGET OBJECT

[76] Inventors: Mark H. Krietzmen; Yu-Hsin Chen, both of 2347 W. 246th Pl., Lomita, Calif. 90717

[21] Appl. No.: 665,337

[22] Filed: Jun. 17, 1996

[51] Int. Cl.⁶ .................................................. A01K 15/02
[52] U.S. Cl. .................................................. 119/708
[58] Field of Search ........................... 119/708, 706, 119/707, 709, 710, 711; 273/329, 330; 473/424, 425, 426, 423, 427, 428, 429, 430; 446/36, 327; 472/7, 8; 73/170.05, 170.06, 170.07, 170.08

[56] References Cited

U.S. PATENT DOCUMENTS

| | | | |
|---|---|---|---|
| 1,006,182 | 10/1911 | Cousin | 119/711 |
| 1,022,112 | 4/1912 | Smith | 119/711 |
| 2,718,873 | 9/1955 | Buckner | 119/711 |
| 3,907,287 | 9/1975 | Fox et al. | 473/424 |
| 4,499,855 | 2/1985 | Galkiewicz | 119/708 |
| 4,907,537 | 3/1990 | Shirk | 119/707 |
| 4,928,632 | 5/1990 | Gordon | 119/709 |
| 5,009,193 | 4/1991 | Gordon | 119/711 |

Primary Examiner—Gene Mancene
Assistant Examiner—Yvonne R. Abbott
Attorney, Agent, or Firm—John H. Vynalek

[57] ABSTRACT

A feline exercise and play target object, comprising a housing having an external wall and an internal wall defining an enclosed cavity; support receiving device incorporated in the housing whereby the housing can be detachably supported and such that the housing can freely rotate while supported; and attraction attachment device incorporated in the housing such that a variety of mechanical attractions can be attached to the housing. The feline exercise and play target object also comprises a filling aperture incorporated in the housing to allow placement of natural attractant into the enclosed cavity and a plurality of pores to allow the natural attractant to escape from the cavity.

17 Claims, 2 Drawing Sheets

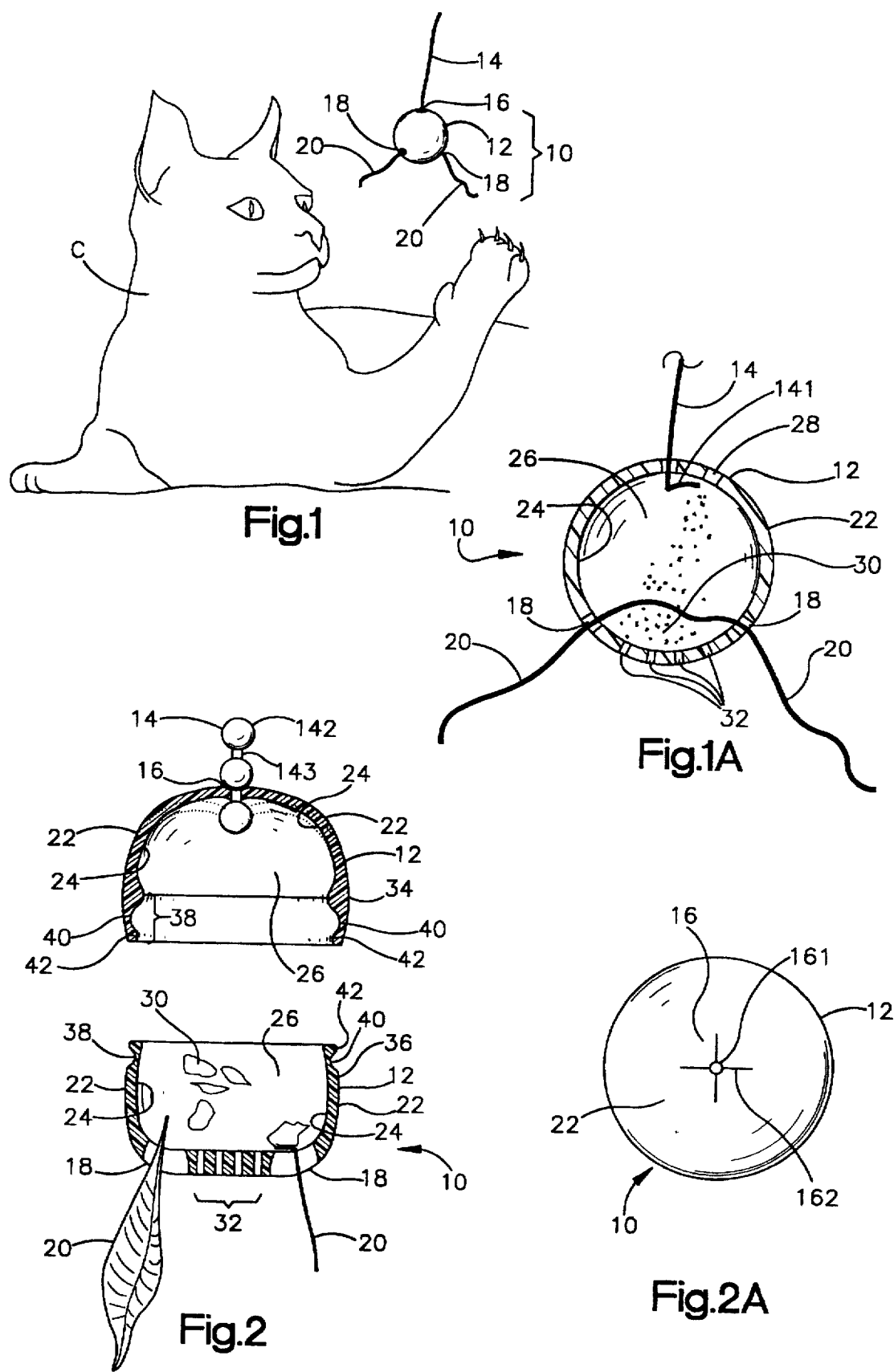

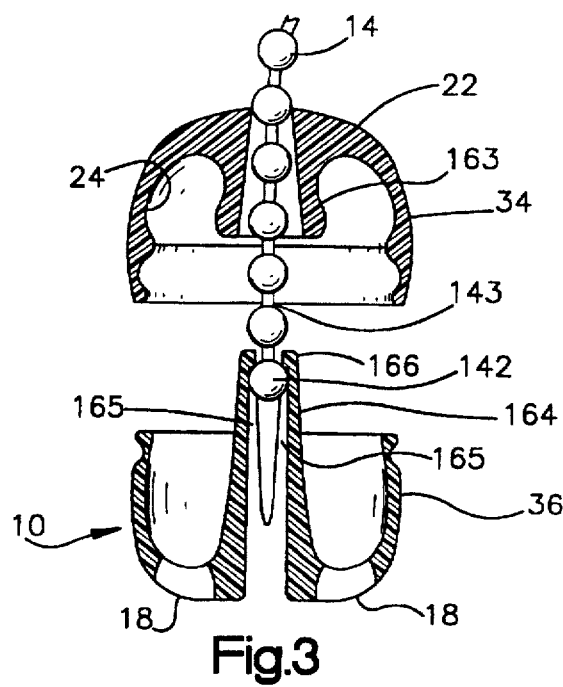
Fig.3
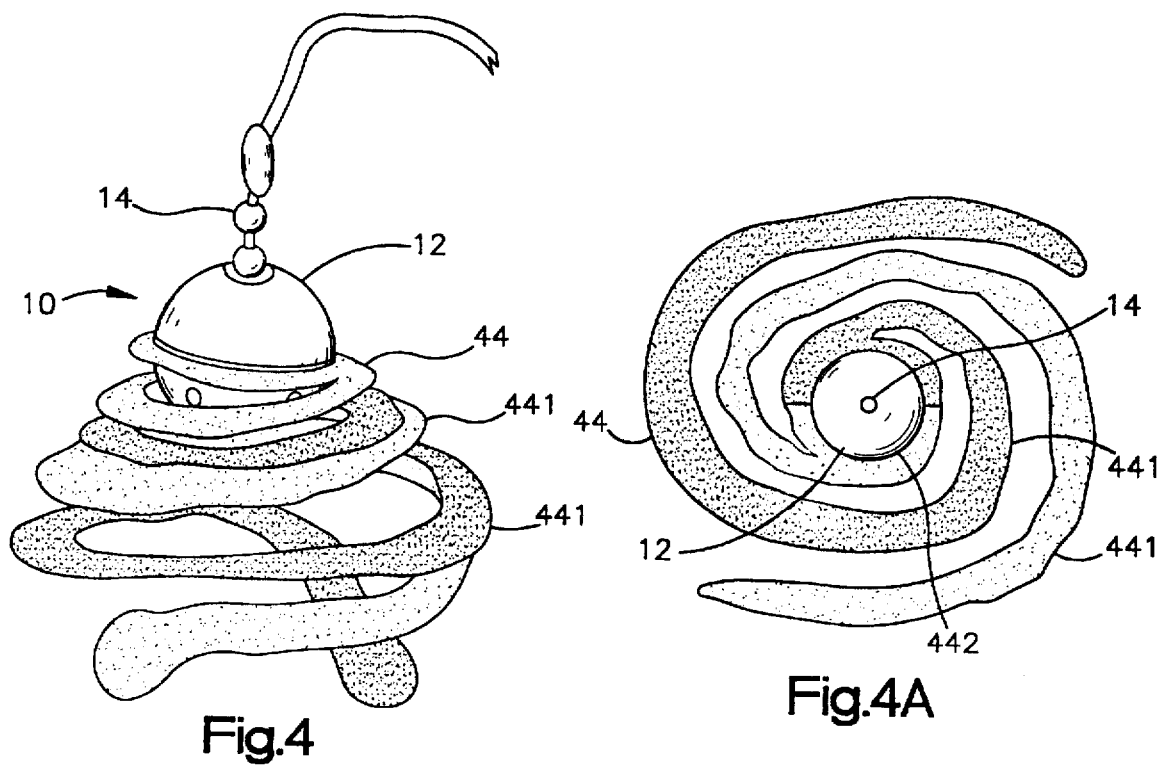
Fig.4
Fig.4A

FELINE EXERCISE AND PLAY TARGET OBJECT

BACKGROUND OF THE INVENTION

This invention relates to the field of feline exercise and play devices and, more particularly, to feline exercise and play devices which incorporate mechanical attractions or dispense natural attractants, such as catnip, and which act as target objects to entice physical interaction by an animal.

The use of mechanical attractions or natural attractants, such as catnip, in a pet toy is well known in the art. Such attractions or attractants are used as, or in, a target object to focus or direct an animal's attention on the pet toy, stimulating the animal and causing it to actively bat, or otherwise play or physically interact with the toy. The play and physical interaction with the toy promotes the physical well-being of the animal by alleviating boredom and destructive behavior while, at the same time, providing the necessary exercise for the animal thereby benefiting it physically.

Cats in particular require an external attraction to stimulate them to engage in play. Catnip, or other natural attractants like anchovy powder, and mechanical attractions, such as ribbons, spinners and whistles, are used, either separately or in combination, to provide this attraction. Natural attractants though, eventually become expended. In addition, the animal may become used to a mechanical attraction limiting its attention span in response thereto When this occurs the toy has reduced and sometimes no attraction to the cat. The attractive aspect of the toy must then be "recharged" by adding fresh catnip, or other attractant, and by changing the type of mechanical attraction, before the toy is again effective.

Additionally, some pet toys are essentially static and respond in only a two dimensional plane. These toys, such as a ball, ball of yarn, or chew toy, roll or move along the floor or ground in response to an impulse from the animal, the batting of a cat, for example. These toys provide limited exercise for the animal and tend to hold its attention for less time. Pet toys that can move in a three dimensional environment and have a kinetic ability prove to be the most effective. These toys most commonly employ a target object attached to, or hung from, an external support or artifice, such as a string, elastic lead or resilient flexible wand to name just a few. These toys, not only, force the animal to stretch and move more, and in different directions, but also, make the animal react to the responsive movement of the target object through its pendulum or oscillating effect. In addition, these toys are usually secured to some stationary base, thereby providing the essential exercise in a limited space. This allows the owner to keep track of the whereabouts of the pet while also promoting its safety.

The target object, though, is the essential component of these toys. It is the component that entices the animal to interact with the toy. It would, therefore, be desirable to have a target object that provides effective enticement by mechanical attractions or natural attractants while, at the same time, being easily attachable to, and detachable from, different kinetically responsive supports. In addition, it would be desirable to have a target object with mechanical attractions that also promote the dispensing of natural attractants thereby continually reinforcing the attraction to the animal as it interacts with the target object.

A cat toy designed to contain a natural attractant such as catnip was taught in U.S. Pat. No. 1,006,182 issued to Frank Cousin. This device involves a barrel shaped structure composed of two halves screwed together forming an internal cavity. The two halves are unscrewed to allow catnip to be placed into the cavity. When the halves are screwed together a cat can play with the structure by rolling it on the ground or floor. Holes in the structure allow the scent of catnip to escape thereby attracting the cat and promoting play. The cat toy taught in this patent is limited in that it only moves in a two dimensional plane, is basically a static device and cannot be used as a target with other toys or supports.

A similar cat toy is taught in U.S. Pat. No. 2,718,873 issued to Louis H. Buckner. That cat toy is composed of a spirally coiled body of spring wire with a bag supported internally. The bag contains the catnip or other attractant and is sufficiently porous to allow the catnip scent to escape. A cat plays with this toy in the same manner as the toy taught in the '172 patent; by rolling it on the ground or floor. The toy taught in this patent is therefore, similarly limited, but, is also limited in that the bag cannot be refilled with fresh catnip or other attractant.

U.S. Pat. No. 4,928,632 issued to Richard A. Gordon teaches a toy composed of a tube of flexible plastic material closed at both ends with catnip disposed therewithin. The tube has a plurality of normally closed pores which open when bitten or manipulated by a cat. This toy is limited in that it is, essentially, a chew toy, and, as with the '873 patents, cannot be used as a target with other toys or supports nor can it be refilled with catnip or other attractant when the original source is expended.

U.S. Pat. No. 4,499,855 issued to John Galkiewicz, teaches a cat toy utilizing a target member. In one embodiment, the target member is a sculptured bag which may include a scent such as catnip in the interior. This patent is limited in that it does not teach a target which may be easily detachable from the rest of the toy and used with other toys or supports nor does it teach a target which can be refilled with catnip or other attractant once the original source is expended.

There does not exist an animal exercise and play target object which incorporates mechanical attractions and/or natural attractants, is easily refillable with the natural attractant, can easily be adapted with different mechanical attractions, while also being easily attachable and detachable as a target object with different pet toys, supports and artifice. In addition there does not exist an animal exercise and play target object that incorporates mechanical attractions that promote the dispensing of natural attractants thereby continually reinforcing the attraction to the animal as it interacts with the target object. There exists therefore, a need for such an animal exercise and play target object.

SUMMARY OF THE INVENTION

The present invention provides a new and improved feline exercise and play target object which satisfies the aforementioned need.

Accordingly, in one aspect, the present invention is directed to a feline exercise and play target object, comprising a housing having an external wall and an internal wall the internal wall defining an enclosed cavity; support receiving means incorporated in the housing whereby the housing can be detachably supported and such that the housing can freely rotate while supported; attraction attachment means incorporated in the housing such that a variety of mechanical attractions can be attached to the housing; a filling aperture incorporated into the housing through which natural attractant can be placed in the enclosed cavity; and a plurality of pores extending into the enclosed cavity from the external wall to the internal wall whereby through which natural attractant can escape from the housing.

In another aspect, the present invention is directed to a feline exercise and play target object, comprising: a housing having first and second parts, the first and second parts defining an enclosed cavity with an internal wall and an external wall, the enclosed cavity suitable for holding natural attractant and the housing having a plurality of pores extending into the enclosed cavity from the external wall to the internal wall whereby through which the natural attractant can escape from the housing and whereby through which mechanical attractions can be affixed to the housing; means for releasably engaging the first part and the second part of the housing such that when the first part is not engaged to the second part access is provided to the enclosed cavity thereby allowing the placement of natural attractant and the attachment of mechanical attractions into the housing; and support receiving means formed in the housing whereby the housing can be releasably attached to a support such that the housing freely moves while so attached and such that the first part can be disengaged from the second part while the housing is so attached.

In still another aspect, the present invention is directed to a feline exercise and play target object, comprising: a housing having an internal wall and an external wall defining an enclosed cavity, the enclosed cavity suitable for holding natural attractant, and the housing having a plurality of pores extending into the enclosed cavity from the external wall to the internal wall whereby through which the natural attractant can escape from the housing and such that mechanical attractions can be affixed to the external wall of the housing; support receiving means formed in the housing whereby the housing can be releasably attached to a support such that the housing freely moves while so attached, and helicoptering means attached to the housing whereby air movement over the helicoptering means causes it to rotate axially thereby spinning the housing such that the spinning of the housing induces a centrifugal force on the natural attractant therein, forcing it to escape from the housing through the pores thereby promoting the dispensing of the natural attractant.

BRIEF DESCRIPTION OF THE DRAWINGS

Further features of the present invention will become apparent to those skilled in the art to which the present invention relates from reading the following specification with reference to the accompanying drawings in which:

FIG. 1 is a view of a feline exercise and play target object interacting with a cat.

FIG. 1A is an enlarged internal view of the feline exercise and play target object of FIG. 1.

FIG. 2 is an internal view of another embodiment of the feline exercise and play target object.

FIG. 2A is a top view of the feline exercise and play target object of FIG. 2.

FIG. 3 is an internal view of another embodiment of a feline exercise and play target object.

FIG. 4 is a view of a feline exercise and play target object with a helicoptering means attached thereto.

FIG. 4A is a top view of the feline exercise and play target object shown in FIG. 4.

DETAILED DESCRIPTION OF THE PREFERRED EMBODIMENT

Referring now to the drawings and, more particularly, FIG. 1, there is shown a view of the animal exercise and play target object 10 of the present invention having a housing 12 attached to a support 14 and being batted by a cat "C". The support 14 can be any type of artifice, material or pet toy; for example, a string, elastic lead, a ball chain or resilient, flexible wand. The housing 12 is releasably attached to the support 14 so as to allow it to be easily detached therefrom and, then, easily attached to other supports or pet toys. The housing 12 has support receiving means 16 incorporated therein. The support 14 is attached to the housing 12 by way of the support receiving means 16. Attraction attachment means 18 are incorporated into the housing 12 to allow attachment of mechanical attractions 20. The mechanical attractions 20 can be any material that provides a sensory enticement for the animal attracting it to the animal exercise and play target object 10 causing the animal to physically interact with it. Examples of such materials are ribbons, leather strips and feathers, to name just a few.

Referring now to FIG. 1A, there is shown an enlarged, internal view of a animal exercise and play target object 10 of FIG. 1. The housing 12 has an external wall 22 and an internal wall 24 defining an enclosed cavity 26. The housing 12 is shown as a sphere, but can be any shape. The support receiving means 16 is an opening extending from the external wall 22 to the internal wall 24. In this FIG. 1A, the support 14 is shown as having a hooked end 141 which passes through the support receiving means 16 and contacts the internal wall 24 providing support for the housing 12. Although not shown in this FIG. 1A, the support receiving means 16 can also be a loop formed in the housing 12 and protruding from the external wall 22. A filling aperture 28 allows the placement of a natural attractant 30, such as catnip, into the enclosed cavity 26. A plurality of pores 32 extending into the enclosed cavity 26 from the external wall 22 to the internal wall 24 allows the natural attractant 30 to escape from the housing 12.

Referring now to FIG. 2, there is shown another embodiment of the invention. In FIG. 2 the housing 12 is shown as having a first part 34 and a second part 36. The first part 34 and the second part 36 are shown disengaged but have releasably engaging means 38 for joining together. When the first part 34 and the second part 36 are not engaged, access is provided to the enclosed cavity 26 to allow placement of a natural attractant 30 and attachment of mechanical attractions 20. In FIG. 2, the releasably engaging means 38 is shown as formed detents 40 and projections 42 which mate when the first part 34 and the second part 36 are engaged to allow them to be releasably engaged by forcing or snapping together. The releasably engaging means 38 can, also, be accomplished by screwing together the first part 34 and the second part 36 in which event they would have matching threaded sections (not shown). The releasably engaging means 38 can, also, be latching means (also not shown).

Still referring to FIG. 2, the support 14 is shown as a ball chain. As shown in FIG. 2A, which is a top view of the housing 12, the support receiving means 16 is a hole 161 sized slightly smaller than the balls 142 on the ball chain 14 but larger than the links 143. A plurality of lateral cuts 162 through the external wall 22 to internal wall 24 extend from the hole 161. As the ball chain 14 is passed through the hole 161, the lateral cuts 162 allow the housing 12 to deform slightly to accept the ball chain 14. Once a ball 142 passes through the hole 161, the housing 12 returns to its undeformed state with the ball 142 contacting the internal wall 24 and providing support for the housing 12. After the ball chain, or other support 14 is attached, the natural attractant 30 is placed in the enclosed cavity 26 and/or the mechanical attractions 20 attached, the first part 34 and the second part 36 are snapped together. The ball chain, or other support, 14 can then be hand held or attached to some artifice or pet toy (not shown) and the animal exercise and play target object 10 is ready for use with an animal.

Referring now to FIG. 3, there is shown another embodiment of the present invention. In FIG. 3, the support receiving means 16 is a channel formed by a first hollow projection 163 extending from the internal wall 24 of the first part 34 and a second hollow projection 164 extending from the internal wall 24 of the second part 36. When the first part 34 and the second part 36 are engaged, the first hollow projection 163 and the second hollow projection 164 mate to form a continuous passage from the external wall 22 of the first part 34 to the external wall 22 of the second part 36. The second hollow projection 164 is formed by a plurality of individual fingers 165 connected to the internal wall 24 of the second part 36 and terminating in a stop 166. When the ball chain 14 passes through the channel formed by the first hollow projection 163 and the second hollow projection 164, the fingers 165 spread to allow the ball 142 to pass the stop 166. The fingers 165 close around the link 143 and the stop 166 retains the ball 142 allowing the ball chain 14 to support the housing 12 from the second part 36. In this manner the first part 34 can be disengaged from the second part 36 with the ball chain 14 still passing through the first hollow projection 163 thereby allowing the first part 34 to slide freely about the ball chain 14. Additionally, although not shown, a plurality of target objects 10 can, in this manner, be sequentially supported on the same ball chain 14 thereby providing additional enticement to the animal.

Referring now to FIG. 4 and FIG. 4A, there is shown an animal exercise and play target object 10 with a helicoptering means 44 attached thereto. FIG. 4A is a top view of FIG. 4. The helicoptering means 44 is formed from concentric spiralling arms 441 with a center attachment hole 442. The center attachment hole 442 is sized to fit on the housing 12 secured between the first part 34 and the second part 36. Air movement over the helicoptering means 44 causes it to rotate axially and the housing 12 to spin thereby creating an additional attraction for the animal. The axial rotation of the housing 12 also induces a centrifugal force on the natural attractant 30 therein, forcing it to escape from the housing 12 through the pores 32 thereby promoting the dispensing of the natural attractant 30.

While the preferred embodiment of the invention has been shown and described, it will be apparent to those skilled in this art that various modifications may be made in this embodiment without departing from the teachings of the present invention.

What is claimed is:

1. A feline exercise and play target object, comprising:
   a) a housing having an external wall and an internal wall said internal wall defining an enclosed cavity;
   b) support receiving means incorporated in said housing whereby said housing can be detachably supported and such that said housing can freely rotate while supported and whereby said support receiving means is a channel through said housing comprised from first and second hollow projections and forming a continuous passage therethrough and having a stop formed in said second hollow projection whereby a support is allowed to pass through said channel and said stop whereby said support contacts said stop and provides support for said housing;
   c) attraction attachment means incorporated in said housing such that a variety of mechanical attractions can be attached to said housing;
   d) a filling aperture incorporated into said housing through which natural attractant can be placed in said enclosed cavity; and
   e) a plurality of pores extending into said enclosed cavity from said external wall to said internal wall whereby through which natural attractant can escape from said housing.

2. The feline exercise and play target object of claim 1, wherein said support receiving means is an opening in said housing extending from said external wall to said internal wall and through which a support is allowed to pass and contact with said internal wall such that support is provided for said housing.

3. The feline exercise and play target object of claim 2, wherein said opening is sized to allow a ball chain to pass therethrough to provide support for said housing.

4. The feline exercise and play target object of claim 1 wherein said second hollow projection is formed from a plurality of fingers terminating in said stop and whereby said fingers spread to allow a ball chain to pass into said second hollow projection and whereby said stop retains a ball of the ball chain thereby providing support for said housing.

5. The feline exercise and play target object of claim 4 further comprising a plurality of target objects sequentially supported on the same ball chain.

6. The feline exercise and play target object of claim 1, further comprising helicoptering means whereby air movement over said helicoptering means causes it to rotate axially thereby spinning said housing.

7. The feline exercise and play target object of claim 6 wherein the spinning of said housing induces a centrifugal force on said natural/attractant therein, forcing it to escape from said housing through said pores thereby promoting the dispensing of said natural attractant.

8. A feline exercise and play target object, comprising:
   a) a housing having first and second parts, said first and second parts defining an enclosed cavity with an internal wall and an external wall, said enclosed cavity suitable for holding natural attractant and said housing having a plurality of pores extending into said enclosed cavity from said external wall to said internal wall whereby through which the natural attractant can escape from said housing and whereby through which mechanical attractions can be affixed to said housing;
   b) means for releasably engaging said first part and said second part of said housing such that when said first part is not engaged to said second part access is provided to said enclosed cavity thereby allowing the placement of natural attractant and the attachment of mechanical attractions into said housing; and
   c) support receiving means formed in said housing whereby said housing can be releasably attached to a support such that said housing freely moves while so attached and such that said first part can be disengaged from said second part while said housing is so attached, said support receiving means is a channel formed by a first hollow projection extending from said internal wall of said first part and a second hollow projection extending from said internal wall of said second part such that when said first part and said second part are engaged said first hollow projection and said second hollow projection mate to form a continuous passage from said external wall of said first part to said external wall of said second part and such that said second hollow projection has a stop formed therein whereby a support is allowed to pass through said first hollow projection into said second hollow projection and to contact said stop and provide support for said housing.

9. The feline exercise and play target object of claim 8, wherein said first part and said second part are threaded to allow them to be releasably engaged by screwing together.

10. The feline exercise and play target object of claim 8, wherein said first part and said second part have formed detents and projections which mate when said first part and said second part are engaged allowing for said first part and said second part to be releasably engaged by snapping together.

11. The feline exercise and play target object of claim 8, wherein said first part is releasably engaged to said second part by latching means.

12. The feline exercise and play target object of claim 8, wherein said support receiving means is an opening in said first part extending from said external wall to said internal wall and through which a support is allowed to pass and contact with said internal wall such that support is provided for said housing.

13. The feline exercise and play target object of claim 12, wherein said opening is sized to allow a ball chain to pass therethrough to provide support for said housing.

14. The feline exercise and play target object of claim 8 wherein said second hollow projection is formed from a plurality of fingers terminating in said stop and whereby said fingers spread to allow a ball chain to pass into said second hollow projection and whereby said stop retains a ball of the ball chain thereby providing support for said housing.

15. The feline exercise and play target object of claim 14 further comprising a plurality of target objects sequentially supported on the same ball chain.

16. The feline exercise and play target object of claim 8, further comprising helicoptering means whereby air movement over said helicoptering means causes it to rotate axially thereby spinning said housing.

17. The feline exercise and play target object of claim 16 wherein the spinning of said housing induces a centrifugal force on said natural attractant therein, forcing it to escape from said housing through said pores thereby promoting the dispensing of said natural attractant.

* * * * *